US011167859B2

(12) United States Patent
Rokkam et al.

(10) Patent No.: US 11,167,859 B2
(45) Date of Patent: Nov. 9, 2021

(54) REMOTE FUEL SYSTEM SENSOR WITH WIRELESS ENERGY HARVESTING

(71) Applicant: Parker-Hannifin Corporation, Cleveland, OH (US)

(72) Inventors: Sridhar Rokkam, Setauket, NY (US); Mark Furmanik, Astoria, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 24 days.

(21) Appl. No.: 16/700,190

(22) Filed: Dec. 2, 2019

(65) Prior Publication Data

US 2020/0189760 A1 Jun. 18, 2020

Related U.S. Application Data

(60) Provisional application No. 62/778,424, filed on Dec. 12, 2018.

(51) Int. Cl.
| | |
|---|---|
| *B64D 37/06* | (2006.01) |
| *B64D 37/02* | (2006.01) |
| *H02J 50/00* | (2016.01) |
| *G06K 7/10* | (2006.01) |
| *B64D 41/00* | (2006.01) |

(52) U.S. Cl.
CPC ............. *B64D 37/06* (2013.01); *B64D 37/02* (2013.01); *B64D 41/00* (2013.01); *G06K 7/10158* (2013.01); *H02J 50/001* (2020.01); *B64D 2221/00* (2013.01)

(58) Field of Classification Search
CPC ........ B64D 37/06; B64D 37/02; B64D 41/00; B64D 2221/00; B64D 37/005; H02J 50/001; H02J 50/23; H02J 50/12; H02J 2310/44; G06K 7/10158; Y02T 50/40; Y02T 50/50
See application file for complete search history.

(56) References Cited

U.S. PATENT DOCUMENTS

| | | | |
|---|---|---|---|
| 6,941,202 B2 * | 9/2005 | Wilson | G01D 9/005 340/572.1 |
| 7,514,804 B2 | 4/2009 | Wang | |
| 9,021,277 B2 | 4/2015 | Shearer et al. | |
| 2014/0166852 A1 | 6/2014 | Hauzeray | |
| 2015/0022376 A1 * | 1/2015 | Zhang | G01F 23/0061 340/870.37 |
| 2015/0215685 A1 * | 7/2015 | Polk | H04Q 9/00 340/870.39 |

* cited by examiner

*Primary Examiner* — Daniel Cavallari
(74) *Attorney, Agent, or Firm* — Renner, Otto, Boisselle & Sklar, LLP

(57) ABSTRACT

An aircraft fuel system includes a fuel tank and at least one electrically-operated sensor arranged within the fuel tank. The at least one electrically-operated sensor is configured to measure a property of fuel in the fuel tank. At least one wireless power transmission device is arranged relative to the fuel tank, the at least one power transmission device is configured to wirelessly transmit electric power to the at least one electrically-operated sensor.

20 Claims, 6 Drawing Sheets

REMOTE FUEL SYSTEM SENSOR WITH WIRELESS ENERGY HARVESTING

RELATED APPLICATION DATA

This application claims the benefit of U.S. Provisional Application No. 62/778,424 filed Dec. 12, 2018, the contents of which are incorporated herein by reference.

FIELD OF INVENTION

The present invention relates generally to aircraft fuel systems, and more particularly to an aircraft fuel system that utilizes wireless energy transmission and harvesting to power sensors of the fuel system.

BACKGROUND

Electric sensors situated in aircraft fuel tanks are being subjected to increasingly tighter restrictions. These mandates, among other factors, limit the amount of electrical energy that can enter a fuel tank to a level below that which could generate a spark and ignite an explosion, for example. These limitations apply to operating energy supplied to in-tank sensors under normal conditions, under conditions when the electrical equipment might fail, as well as when the aircraft is subjected to a lightning event.

One technique for limiting electrical energy entering a fuel tank utilizes a high-resistance wire. More specifically, an electrical connection between the sensor and an externally-mounted interrogator, which reads data from the sensor, may be via wire have a predetermined resistance per linear length. The resistance of the wire limits electrical energy entering the fuel tank, thus meeting safety requirements.

SUMMARY OF INVENTION

A drawback to using high-resistance wire to couple the sensor to an interrogator is that the wire, due to the high resistance, cannot provide power required to continuously operate the electrical sensor. As used herein, the term "high resistance" is defined as a resistance that, due to a voltage drop caused by the resistance, results in power supplied to the sensor to be below a minimum operating voltage of the sensor. Consequently, in such systems an alternate means of power delivery to each sensor is necessary.

A system and method in accordance with the present invention provide electric power wirelessly to one or more sensors located inside an aircraft fuel tank. The electric energy may be harvested from the aircraft, such as from vibration, fluid movement, etc. Alternatively, the electric energy may be generated by a power source of the aircraft and delivered via a wired connection to a wireless power transmission device where it is wirelessly transmitted to sensors inside the fuel tank. Additionally, energy may be harvested from a high-resistance communication line and used by the sensor to periodically transmit a status message in the event primary power is lost.

According to one aspect of the invention, an aircraft fuel system includes a fuel tank; at least one electrically-operated sensor arranged within the fuel tank, the at least one electrically-operated sensor configured to measure a property of fuel in the fuel tank; and at least one wireless power transmission device arranged relative to the fuel tank, wherein the at least one power transmission device is configured to wirelessly transmit electric power to the at least one electrically-operated sensor.

Optionally, the fuel system includes at least one electric energy harvesting device operatively coupled to the at least one power transmission device, the at least one electric energy harvesting device configured to harvest electric energy from at least one of vibration, fluid flow variation, or fluid pressure variation.

Optionally, the energy harvesting device comprises a piezoelectric element.

Optionally, at least a portion of the at least one wireless power transmission device is arranged within an interior of the fuel tank.

Optionally, the at least one power transmission device comprises an antenna, and at least a portion of the antenna is arranged within an interior of the fuel tank.

Optionally, the fuel system includes an interrogator communicatively coupled to the at least one electrically-operated sensor.

Optionally, the interrogator is communicatively coupled to the at least one sensor via a wired electrical connection.

Optionally, the interrogator is communicatively coupled to the at least one sensor via a wireless electrical connection.

Optionally, the at least one electrically-operated sensor receives trickle power via the wired electrical connection.

Optionally, the trickle power is sufficient to power at least a communication portion of the at least one electrically-operated sensor.

Optionally, the at least one electrically-operated sensor comprises an energy storage device, the at least one electrically-operated sensor configured to store power received via the wired electrical connection as energy, and upon the stored energy exceeding a prescribed threshold level the at least one sensor is configured to enable a communication portion of the at least one sensor and communicate a status message to the interrogator.

Optionally, the at least one electrically-operated sensor comprises a level sensor, a flow sensor, a temperature sensor, a pressure sensor or a densitometer.

According to another aspect of the invention, a method of powering at least one electrically-operated sensor arranged within an aircraft fuel tank is provided, where the at least one electrically-operated sensor configured to measure a property of fuel in the fuel tank. The method includes wirelessly transmitting electric power to the at least one electrically-operated sensor.

Optionally, the method includes harvesting electric energy from at least one of vibration, fluid flow variation, or fluid pressure variation, and using the harvested energy as a source for the wirelessly transmitted power.

Optionally, harvesting includes using a piezoelectric element to harvest the electric energy.

Optionally, the method includes harvesting energy from a high-resistance communication line connecting the at least one electrically operated sensor to an interrogator.

Optionally, the method includes upon the harvested energy exceeding a prescribed threshold, using the harvested energy to power a communication section of the at least one electrically-operated sensor and transmitting a status message via the communication section to the interrogator.

The foregoing and other features of the invention are hereinafter described in greater detail with reference to the accompanying drawings.

DETAILED DESCRIPTION

Figure 1:
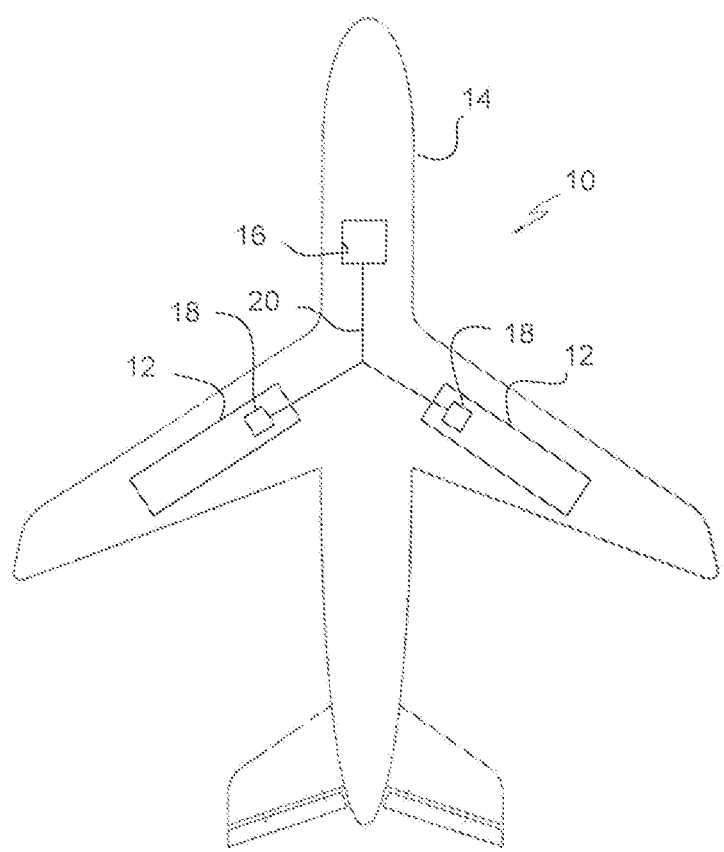
FIG. 1 is a schematic diagram of an aircraft that includes a fuel tank sensor system in accordance with the present invention.

Referring now in detail to the drawings and initially to FIG. 1, illustrated is a fuel measurement system 10 for measuring a property of a fuel stored in a tank 12 of an aircraft 14. While the fuel tank 12 may be formed from a conductive material, preferably, the fuel tank 12 is formed from a composite, non-conductive material, and optionally may include a conductive mesh surrounding the composite material and/or at least partially formed in the composite material so as to form a faraday cage around the fuel tank 12. The aircraft fuel measurement system 10 includes an interrogator 16 and at least one electrically-operated sensor 18 arranged within the tank 12, the sensor 18 communicatively connected to the interrogator 16 via a wired connection 20. The sensor 18 may be partially or completely immersed in the fuel or may be arranged such that it is not immersed in the fuel (e.g., in an upper portion of the tank 12).

The wired connection 20 may comprise unshielded resistive wire having a predetermined resistance. Connections between each sensor 18 may be daisy-chained to reduce weight of the wiring harness. Communications between the interrogator 16 and each sensor 18 via the wired connection 20 may be implemented, for example, using differential mode digital communication, which provides increased immunity to wireless power transmission. Alternatively, frequency modulation techniques may be used for data communication. As will be appreciated, other techniques for exchanging data between the sensor 18 and the interrogator 16 may be employed provided such techniques are compatible with the wireless power systems.

In the exemplary embodiment, each sensor 18 is arranged within the fuel tank 12 and is operative to provide data indicative of a property of the fuel in the tank 12, while the interrogator 16 is located remote from the fuel tank (e.g., in the avionics bay of the aircraft 14). The interrogator 16 communicates with each sensor 18 via the wired connection 20. Although the interrogator 16 is shown communicating with a single sensor 18 in a single fuel tank 12, the interrogator 16 may communicate with multiple sensors in each tank and/or in sensors in multiple tanks of the aircraft 10. Each sensor 18 is configured to measure a property of fuel in the fuel tank 12, such as a temperature of the fuel, a level of the fuel, a pressure applied to the fuel, a density of the fuel, a flow of the fuel into and/or out of the fuel tank 12, etc.

Due to the high resistance of the wired connection 20 between the interrogator 16 and each sensor 18, power to operate each sensor 18 cannot be delivered through the wired connection 20. To power the sensors 18, power is provided to each sensor 18 via a wireless means.

Figure 2A:
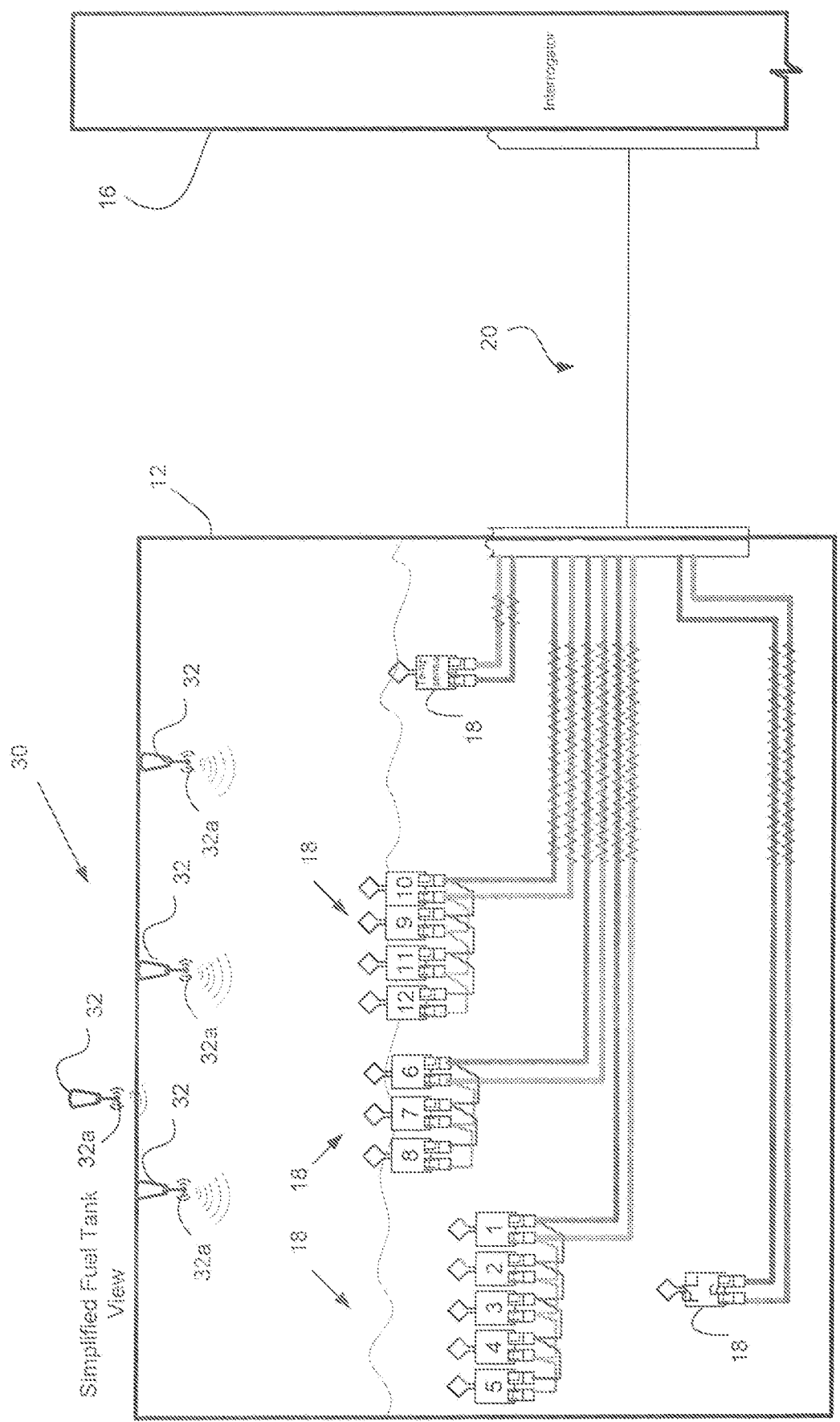
FIG. 2A is a schematic diagram illustrating an exemplary aircraft fuel tank having a plurality of sensors in the fuel tank that receive wireless power and utilize a wired communication link in accordance with the present invention.
Figure 2B:
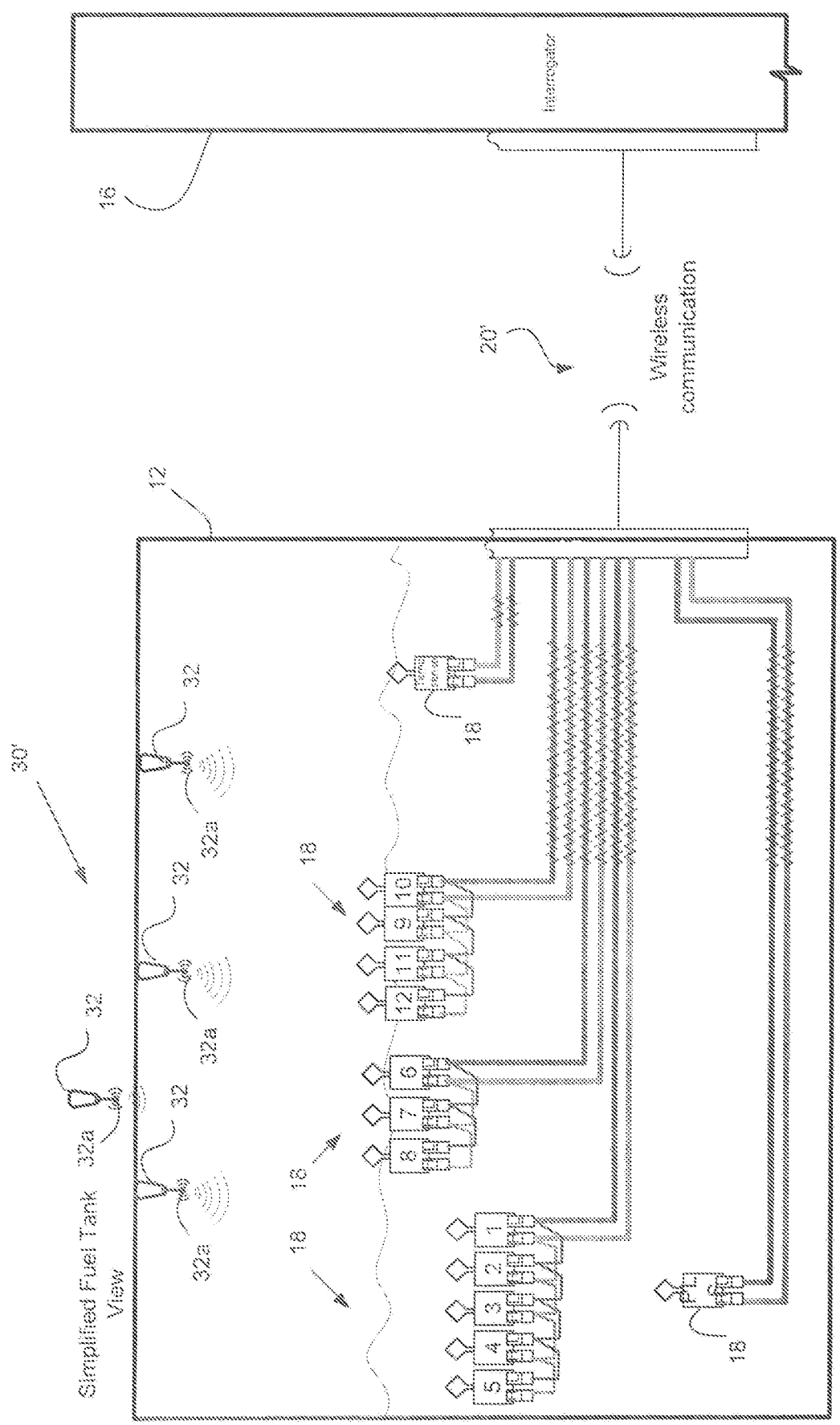
FIG. 2B is a schematic diagram illustrating another exemplary aircraft fuel tank having a plurality of sensors in the fuel tank that receive wireless power and utilize a wireless communication link in accordance with the present invention.

With reference to FIGS. 2A and 2B, schematically illustrated are exemplary wireless power transmission systems 30, 30' for powering sensors 18 arranged within a fuel tank 12. FIG. 2A utilizes a high-resistance wired connection 20 for exchanging data between each sensor 18 and the interrogator 16, while FIG. 2B utilizes a wireless communication link 20' for exchanging data between each sensor and 18 and the interrogator 16. Other than the wired connection 20 and wireless connection 20', the systems 30 and 30' are substantially the same and thus only the system 30 in FIG. 2A will be further described.

The wireless power transmission system 30 includes at least one wireless power transmission device 32 arranged relative to the fuel tank 12, the power transmission device 32 being configured to wirelessly transmit electric power to the electrically-operated sensor 18. The wireless power transmission device 32 is configured to provide a power output that is sufficient to compensate for power attenuation due to the sensors 18 being immersed in fuel and scaled based on the distance between the power transmission device 32 and the sensor(s) 18 that receive the transmitted power.

Multiple wireless power transmission devices 32 can be arranged relative the fuel tank 12 in order to provide coverage in a tank having a non-uniform shape. The use of multiple wireless power transmission devices 32 has the benefit of providing fault tolerance/availability, where the failure of one transmission device 32 does not affect overall system operation (e.g., a sensor can receive power from multiple transmission devices, and the failure of one power transmission device may not cause loss of power at the sensor). The multiple wireless power transmission devices 32 also can provide directed beams, which can avoid sending more power into the tank 12 than is required by the sensors 18.

Each wireless power transmission device 32 may be arranged external from the fuel tank 12, and the transmitted power may penetrate through the fuel tank 12, particularly when the tank 12 is formed from composite materials. In the event a shield surrounds the tank 12, at least a portion of the wireless power transmission device 32 can be arranged in an interior of the fuel tank 12. For example, at least an antenna 32a of the power transmission device 32 can be arranged within an interior of the fuel tank 12. In this manner, RF power can be transmitted into the tank despite the shield around the tank. Each sensor 18 receives the RF power and converts it to a voltage utilized by the sensor.

It is noted that while primary power to the sensor 18 is provided via the wireless power transmission devices 32 and not the wired connection 20, the wired connection can provide trickle power to each sensor 18. Such trickle power, while not sufficient to power the entire sensor 18, is preferably sufficient to power at least a communication portion of the electrically-operated sensor 18 (e.g., to power the circuitry for i) establishing communications with the interrogator 16, ii) generating a message for the interrogator 16, and iii) transmitting the generated message to the interrogator via the established communications). The trickle power may be provided to each sensor 18 individually or as a group.

For example, the electrically-operated sensor 18 may include an energy storage device, such as a capacitor, a battery (e.g., a rechargeable battery) or the like along with circuitry to charge the storage device and generate power from the storage device. The energy storage device may be configured to store energy received via the wired electrical connection 20. Upon the stored energy exceeding a prescribed threshold level, a communications portion of the sensor may be configured to communicate with the interrogator 16 via the wired connection 20.

By powering a communication portion of each sensor 18, the interrogator 16 can be informed when there is insufficient power from the wireless power transmission system 30 to operate the sensor 18. In this manner, the interrogator 16 may be informed that the sensor 18 is operational, but due to a low power condition the sensor 18 cannot perform measurements.

In one embodiment, each wireless power transmission device 32 may receive power from a power supply. For example, a power supply located in the avionics bay of the aircraft 14 may be electrically connected to each wireless power transmission device 32, the power supply providing electric power to each power transmission device 32. The wireless power transmission device 32 then prepares the power for wireless transmission and then wirelessly transmits the power to each sensor 18.

In another embodiment, each wireless power transmission device 32 receives electric power from an electric energy harvesting device, the electric energy harvesting device being configured to harvest electric energy from systems of the aircraft. For example, fluid contains hydraulic power that can be converted to electric power. Harvesting devices, such as piezoelectric elements, can be coupled to various aircraft components to generate power via pressure ripple, pressure flow and/or turbulence within the fluid flow (e.g., turbulence at a connector). The power can be stored in a storage device for use by each wireless power transmission device 32.

Figure 3:
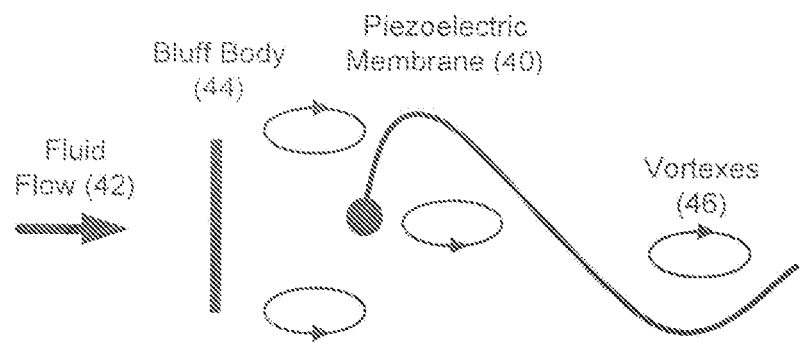
FIG. 3 illustrates an oscillating piezoelectric membrane capturing energy from hydraulic flow into a bluff body from a vortex.

One method in which a piezoelectric device, such as a piezoelectric membrane, may be used to harvest electric power is to place the piezo electric device in the wake of a bluff body (e.g., a flat plate) that is in a fuel delivery path, the wake causing the membrane to oscillate behind the bluff body due to vortex shedding. Vortex shedding is an oscillating flow that takes place when a fluid flows past a bluff body at certain velocities. This repeating pattern of swirling vortices is called von Karman Vortex Street. Use of an oscillating piezoelectric membrane 40 to capture energy from hydraulic flow 42 into a bluff body 44 from a vortex 46 is illustrated schematically in FIG. 3. The piezoelectric membrane 40 then converts the captured energy to electrical energy using piezoelectric effect, and the energy is regulated and stored in an energy storage device for subsequent distribution to other devices. In addition to vortex shedding, fluid pressure ripple or fluctuation in the fluid system can be used to harvest power, as can vibration from fluid flow, the aircraft itself or aircraft subsystems.

Figure 4:
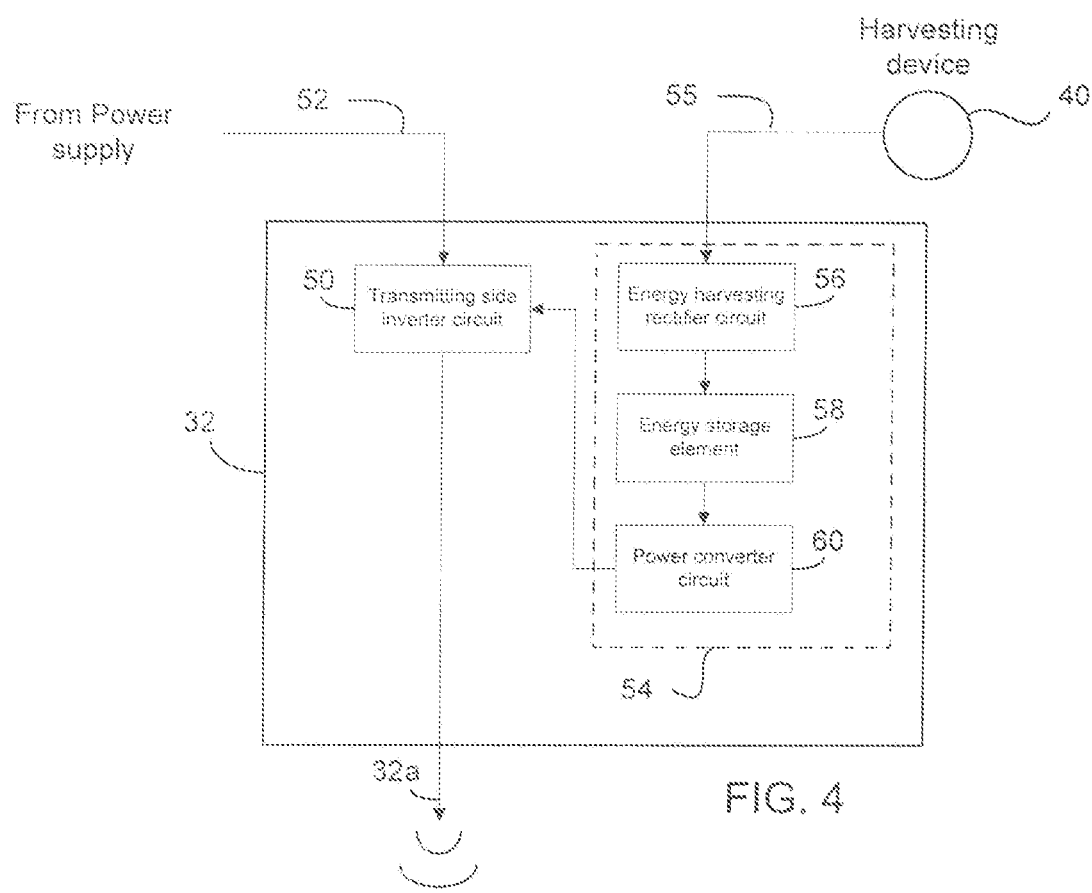
FIG. 4 is a block diagram illustrating an exemplary wireless power transmitter that can be used in accordance with the invention.

Referring now to FIG. 4, illustrated is a block diagram of an exemplary wireless power transmission device 32 that may be used in the fuel measurement system 10 according to the invention. The wireless power transmission device 32 includes a transmitting side inverter circuit 50, which receives DC power from a power supply (not shown) via a wired electrical connection 52. The transmitting-side inverter circuit 50 converts the received power into transmitting side AC power. The transmitting side inverter circuit 50 is electrically connected to a power transmitting antenna 32a, which transmits the AC power to the sensors 18.

The wireless power transmission device 32 may optionally include an energy harvesting circuit 54. A harvesting element, such as a piezoelectric membrane 40 or other like device, is electrically connected to the energy harvesting circuit 54 via a wired connection 55, the piezoelectric element 40 operative to convert mechanical power into electrical power. The mechanical power may be generated from fluid flow, vibration, etc. as described herein, which causes mechanical displacement of the piezoelectric element 40. Displacement of the piezoelectric element generates low-level AC power that is provided to an energy harvesting rectifier circuit 56 of the energy harvesting circuit 54. The energy harvesting rectifier circuit 56 rectifies the AC power from the piezoelectric element 40 into DC power and stores it as energy in an energy storage element 58 (e.g., a battery, capacitor, or other charge storing element). A power converter 60 is electrically connected to the energy storage element 58 and uses the energy to produce power for use by the inverter circuit 50. In this regard, the power converter circuit may include logic that detects when the energy stored in the energy storage element 58 is at or above a prescribed threshold level, and if so used the energy stored in the energy storage element to generate power for the transmitting side inverter circuit 50. In this manner, the harvested power may supplement the power provided by the power supply and/or if sufficient power is harvested, may provide power in instances when the power supply has failed. It is noted that while the energy harvesting circuit 54 is shown as part of the wireless power transmission device 32, the harvesting circuit may be located remote from the power transmission device 32.

Figure 5:
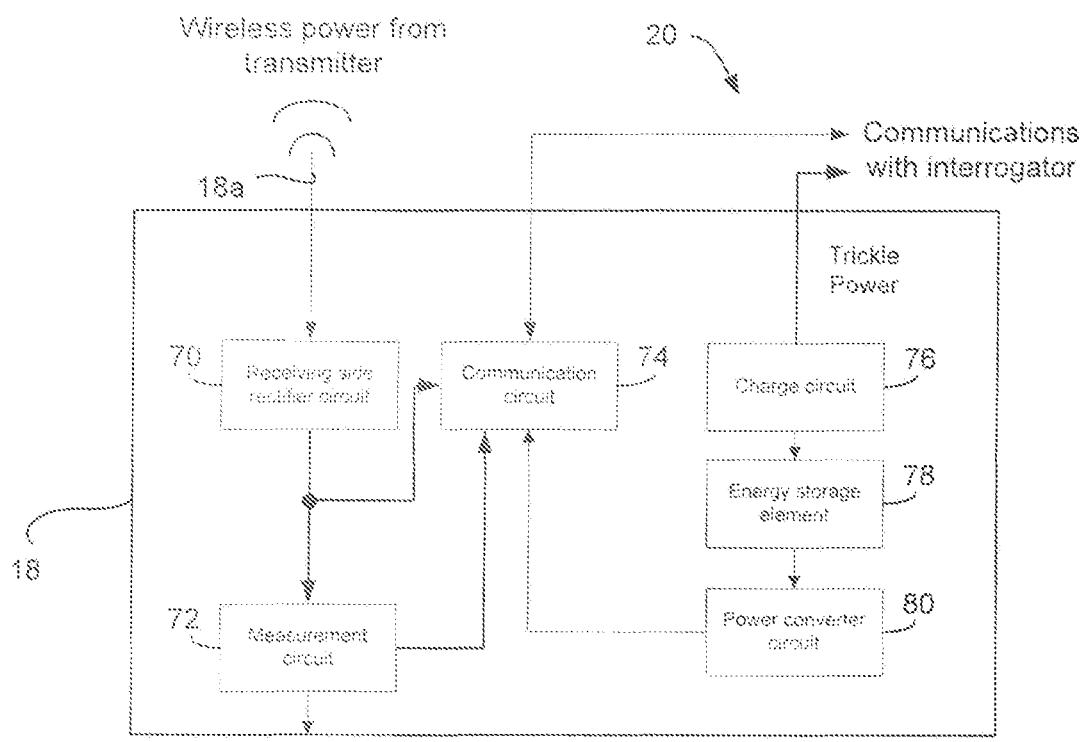
FIG. 5 is a block diagram illustrating an exemplary sensor that can be used in conjunction with the wireless power transmitter of FIG. 4 in accordance with the invention.

Moving now to FIG. 5, illustrated is a block diagram of an exemplary sensor 18 that may be used in the fuel measurement system 10 according to the invention. The exemplary sensor 18 includes an antenna 18a or like element for receiving wireless power from the wireless power transmission device 32. The antenna 18a is electrically connected to a receiving side rectifier circuit 70, which converts the RF power from the power transmission device 32 and rectifies the power to provide a voltage for use by circuitry of the sensor 18. The rectifier circuit 70 is electrically connected to a measurement circuit 72 and to a communication circuit 74 to provide rectified power to both circuits.

The measurement circuit 72 is operative to measure a parameter of the fuel in the tank 12 and can include a sensing element and corresponding circuitry to perform such measurements. The measurement circuit 72 is communicatively coupled to the communication circuit 74 to provide measurement data thereto.

The communication circuit 74 provides two-way communication between the sensor 18 and the interrogator 16 via the wired connection 20. More specifically, the communication circuit 74 can receive commands, such as status requests, from the interrogator 16, and can provide a response to each status request as well as measurement data provided by the measurement circuit 72 via the wired connection 20.

As discussed above, while the high-resistance wired connection 20 does not provide power to continuously operate the entire sensor 18, the wired connection 20 can be used to provide "trickle" power that may be used in instances when the primary power (i.e., the wireless power system) is unable to power the sensor 18. For example, low-current power may be provided via the wired connection 20 to a charge circuit 76 of the sensor 18, the charge circuit 76 being electrically connected to an energy storage element 78. The charge circuit 76 utilizes the low-current power to charge the energy storage element 78 (e.g., a battery, a capacitor or other electric charge storage element) at a low charge rate. The charge circuit 76 can also monitor the charge level on the storage element 78 in order to maintain the stored charge at a desired level. A power converter circuit 80 is electrically connected to the energy storage element 78 and to the communication circuit 74, the power converter 80 operative to utilize the stored energy to generate power for the communication circuit 74.

The communication circuit 74 can be configured to detect when primary power from the wireless power system 30 is lost or otherwise not operational. Upon detecting primary power loss, the communication circuit 74 can switch to backup power provided by the power converter circuit 80. While operating on backup power, the communication circuit 74 can generate and transmit a status message to the interrogator 16 indicating that the sensor 18 is alive but does not have sufficient power to provide valid measurements. In this manner, service personnel can know that the loss of measurement data is not necessarily due to the sensor itself.

Figure 6:
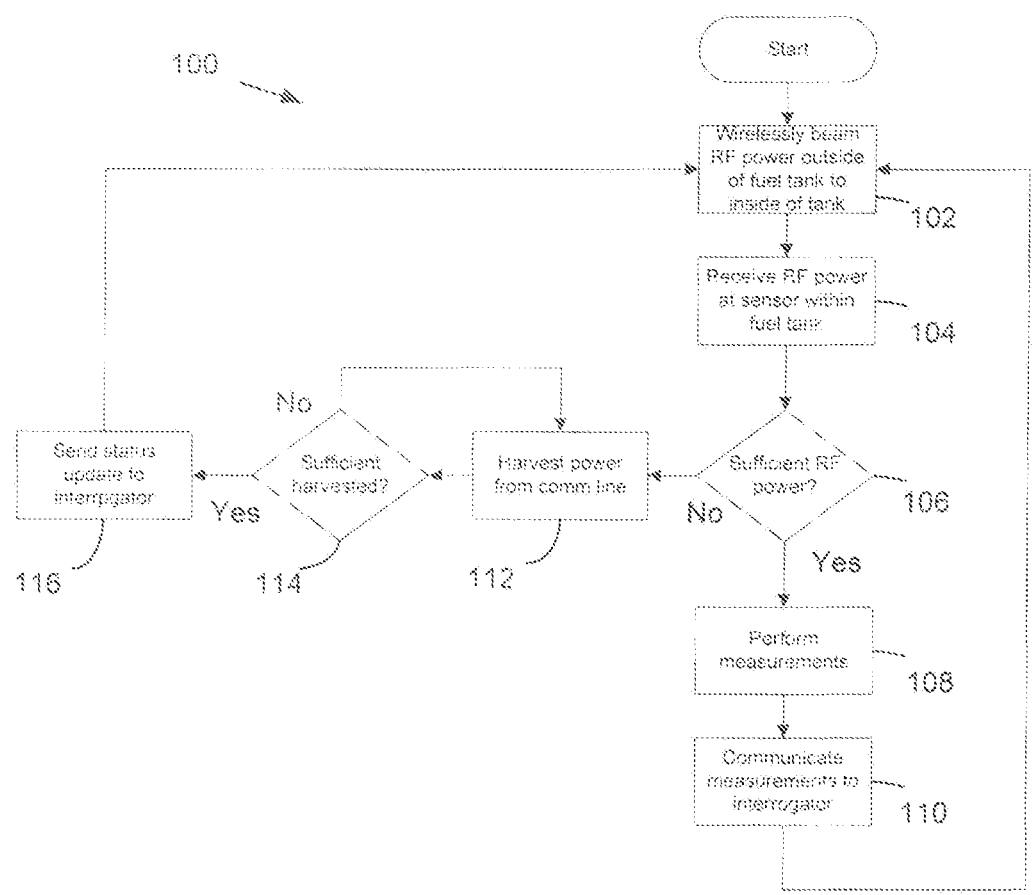
FIG. 6 is a flow diagram illustrating exemplary steps of a method in accordance with the invention.

Moving now to FIG. 6, illustrated is a flow chart 100 that provides exemplary steps for operating a fuel measurement system 10 in accordance with the invention. The flow chart includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence Beginning at step 102, power is wirelessly transmitted from outside the fuel tank 12 to an inside portion of the fuel tank 12 where the sensors 18 reside. At step 104 each sensor 18 receives and utilizes the wireless power to operate the sensor and at step 106 and the sensor attempts to operate in a normal "measuring" manner. At step 106 if there is sufficient power to perform measurements then the method moves to step 108 where the sensor 18 performs a measurement (e.g., fuel level, temperature, pressure, etc.). Next at step 110 the sensor 18 communicates the measured data to the interrogator 16 via the high-resistance line 20, and the method then moves back to step 102 and repeats.

Moving back to step 106, if the received power is not sufficient to perform measurements, then the method moves to step 112 and the sensor harvests power from the high resistance line 20. For example, low-level current provided via the high-resistance line 20 can be collected and stored in an energy storage device of the sensor. At step 114 it is determined if the harvested energy stored in the energy storage device exceeds a threshold level and if not, the method loops back to step 112 and repeats. If the harvested energy stored in the energy storage device does exceed the threshold level the method moves to step 116 where the harvested energy is used to power a communication portion of the sensor 18. The communication portion of the sensor then generates a status message and transmits, via the communication section, the status message to the interrogator 16. The method then moves back to step 102 and repeats.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft fuel system, comprising:
a fuel tank;
at least one electrically-operated sensor arranged within the fuel tank, the at least one electrically-operated sensor configured to measure a property of fuel in the fuel tank;
at least one wireless power transmission device arranged relative to the fuel tank, wherein the at least one wireless power transmission device is configured to wirelessly transmit electric power to the at least one electrically-operated sensor; and
at least one electric energy harvesting device operatively coupled to the at least one wireless power transmission device, the at least one electric energy harvesting device configured to harvest electric energy from at least one of vibration, fluid flow variation, or fluid pressure variation.

2. The aircraft fuel system according to claim 1, wherein the energy harvesting device comprises a piezoelectric element.

3. The aircraft fuel system according to claim 1, wherein at least a portion of the at least one wireless power transmission device is arranged within an interior of the fuel tank.

4. The aircraft fuel system according to claim 1, wherein the at least one power transmission device comprises an antenna, and at least a portion of the antenna is arranged within an interior of the fuel tank.

5. The aircraft fuel system according to claim 1, further comprising an interrogator communicatively coupled to the at least one electrically-operated sensor.

6. The aircraft fuel system according to claim 5, wherein the interrogator is communicatively coupled to the at least one sensor via a wired electrical connection.

7. The aircraft fuel system according to claim 5, wherein the interrogator is communicatively coupled to the at least one sensor via a wireless electrical connection.

8. The aircraft fuel system according to claim 6, wherein the at least one electrically-operated sensor receives trickle power via the wired electrical connection.

9. The aircraft fuel system according to claim 8, wherein the trickle power is sufficient to power at least a communication portion of the at least one electrically-operated sensor.

10. The aircraft fuel system according to claim 8, wherein the at least one electrically-operated sensor comprises an energy storage device, the at least one electrically-operated sensor configured to store power received via the wired electrical connection as energy, and upon the stored energy exceeding a prescribed threshold level the at least one sensor is configured to enable a communication portion of the at least one sensor and communicate a status message to the interrogator.

11. The aircraft fuel system according to claim 1, wherein the at least one electrically-operated sensor comprises a level sensor, a flow sensor, a temperature sensor, a pressure sensor or a densitometer.

12. An aircraft comprising the aircraft fuel measurement system according to claim 1.

13. A method of powering at least one electrically-operated sensor arranged within an aircraft fuel tank, the at least one electrically-operated sensor configured to measure a property of fuel in the fuel tank, the method comprising wirelessly transmitting electric power to the at least one electrically-operated sensor; and harvesting energy from a high-resistance communication line connecting the at least one electrically operated sensor to an interrogator.

14. The method according to claim 13, further comprising harvesting electric energy from at least one of vibration, fluid flow variation, or fluid pressure variation, and using the harvested energy as a source for the wirelessly transmitted power.

15. The method according to claim 14, wherein harvesting includes using a piezoelectric element to harvest the electric energy.

16. The method according to claim 13, further comprising upon the harvested energy exceeding a prescribed threshold, using the harvested energy to power a communication section of the at least one electrically-operated sensor and transmitting a status message via the communication section to the interrogator.

17. An aircraft fuel system, comprising:
a fuel tank;
at least one electrically-operated sensor arranged within the fuel tank, the at least one electrically-operated sensor configured to measure a property of fuel in the fuel tank;
at least one wireless power transmission device arranged relative to the fuel tank, wherein the at least one power transmission device is configured to wirelessly transmit electric power to the at least one electrically-operated sensor; and
an interrogator communicatively coupled to the at least one electrically-operated sensor, wherein the interrogator is communicatively coupled to the at least one sensor via a wired electrical connection.

18. The aircraft fuel system according to claim 17, wherein the at least one electrically-operated sensor receives trickle power via the wired electrical connection.

19. The aircraft fuel system according to claim 18, wherein the trickle power is sufficient to power at least a communication portion of the at least one electrically-operated sensor.

20. The aircraft fuel system according to claim 18, wherein the at least one electrically-operated sensor comprises an energy storage device, the at least one electrically-operated sensor configured to store power received via the wired electrical connection as energy, and upon the stored energy exceeding a prescribed threshold level the at least one sensor is configured to enable a communication portion of the at least one sensor and communicate a status message to the interrogator.

* * * * *